United States Patent [19]

Klaschka

[11] 4,114,244
[45] Sep. 19, 1978

[54] METHOD FOR MOUNTING OF ELECTRICAL COMPONENTS, IN PARTICULAR ELECTROLYTE CAPACITORS

[76] Inventor: Rudolf Klaschka, Tannenweg 9, 7896 Wutoschingen, Fed. Rep. of Germany

[21] Appl. No.: 781,676

[22] Filed: Mar. 28, 1977

[30] Foreign Application Priority Data

Apr. 3, 1976 [DE] Fed. Rep. of Germany ....... 2614497

[51] Int. Cl.² .......................................... H01G 7/00
[52] U.S. Cl. ................................. 29/25.41; 29/458; 29/511; 29/520; 361/433
[58] Field of Search ............... 29/511, 458, 517, 520, 29/25.41; 53/43, 37, 320, 366; 361/433

[56] References Cited

U.S. PATENT DOCUMENTS

| | | | |
|---|---|---|---|
| 2,825,855 | 3/1958 | Frekko | 29/517 UX |
| 3,099,069 | 7/1963 | Pugh et al. | 29/25.41 |
| 3,209,216 | 9/1965 | Langridge et al. | 29/511 X |
| 3,349,295 | 10/1967 | Sparkes | 361/433 |
| 3,349,543 | 10/1967 | Carmichael et al. | 29/511 UX |
| 3,723,949 | 3/1973 | Wallo | 29/520 X |
| 3,881,163 | 4/1975 | Lindroth et al. | 29/511 X |

*Primary Examiner*—Charlie T. Moon
*Attorney, Agent, or Firm*—Hauke and Patalidis

[57] ABSTRACT

The present invention is a method for encapsulating an electrical or electronic component such as, for example, an electrolytic capacitor, in a metallic housing whose opening is obturated by a resilient plug through which project the terminals of the encapsulated electrical or electronic component, by providing the housing with an enlarged neck portion through which the electrical or electronic component is inserted into the housing and across which the resilient plug is disposed, by subsequently reducing the width of the housing neck and by crimping or beading the edge of the housing opening such as to hold the plug in tension in position in the neck of the housing.

10 Claims, 6 Drawing Figures

METHOD FOR MOUNTING OF ELECTRICAL COMPONENTS, IN PARTICULAR ELECTROLYTE CAPACITORS

BACKGROUND OF THE INVENTION

It is known to enclose electrical and electronic components in a protective housing which, for example, is made of aluminum sheet metal coated with plastic, as disclosed in German Pat. No. 2,165,039, the housing being of a constant width along its longitudinal axis and having an opening which is closed by means of a resilient plug after insertion in the housing of the component. An assembly fixture in the form of a funnel-shaped conduit is placed over the opening of the housing, and the plug, which has a diameter larger than the housing neck diameter, is pressed forward through the funnel shaped conduit and is laterally compressed such that it is eventually firmly held under tension within the opening sidewall. In this method of assembly, it is necessary to place a tubular needle through the plug to place the inside of the housing in communication with the ambient atmosphere in order to allow the air within the housing which becomes compressed during insertion of the plug to escape to the ambient. The tubular needle must subsequently be removed which often results in damage to the plug or to the housing plastic insulation, especially in the vicinity of the housing opening rim as the tubular needle is preferably placed between the edge of the plug and the rim of the housing opening. As the component to be encapsulated is usually already attached to the resilient plug, pressing the resilient plug with the component attached thereto through the funnel-shaped conduit into the opening of the housing is a delicate and complicated process and, in addition, it is difficult to apply through the assembly fixture the desired high pressure which must be exerted on the plug in order to compact it enough to seal the relatively narrow opening of the housing.

It is the purpose of the present invention to provide a method permitting to mount electrical or electronic components in a housing and to seal the housing in a speedier manner, and to provide an improved sealing of the housing as well as to prevent damage from being inflicted to the plastic coating of the housing.

SUMMARY OF THE INVENTION

The present invention accomplishes its objects by utilizing a housing having an enlarged neck opening accepting a resilient plug of a width corresponding to the width of the opening, and reducing the width of the opening by means of an appropriate crimping die, such as to place the plug under compression and hold it tightly in the housing opening.

In order to provide an additional improvement of the sealing of the plug compressed in the opening of the housing and, more particularly, for the purpose of improving the electrical insulation of the terminals disposed through the plug, the present invention, according to one of its preferred embodiments, contemplates to bend or bead the rim of the housing opening inwardly by means of an appropriate beading tool. The invention further contemplates to form a circular peripheral bead in the housing during crimping of the housing enlarged neck opening to provide an abutment for the plug which prevents unintentionally pushing the plug too far into the housing.

The many objects and advantages of the present invention will become apparent to those skilled in the art, when the following description of the best modes contemplated for practicing the invention is read in conjunction with the accompanying drawing wherein:

DETAILED DESCRIPTION OF THE PREFERRED EMBODIMENTS

Figure 1:
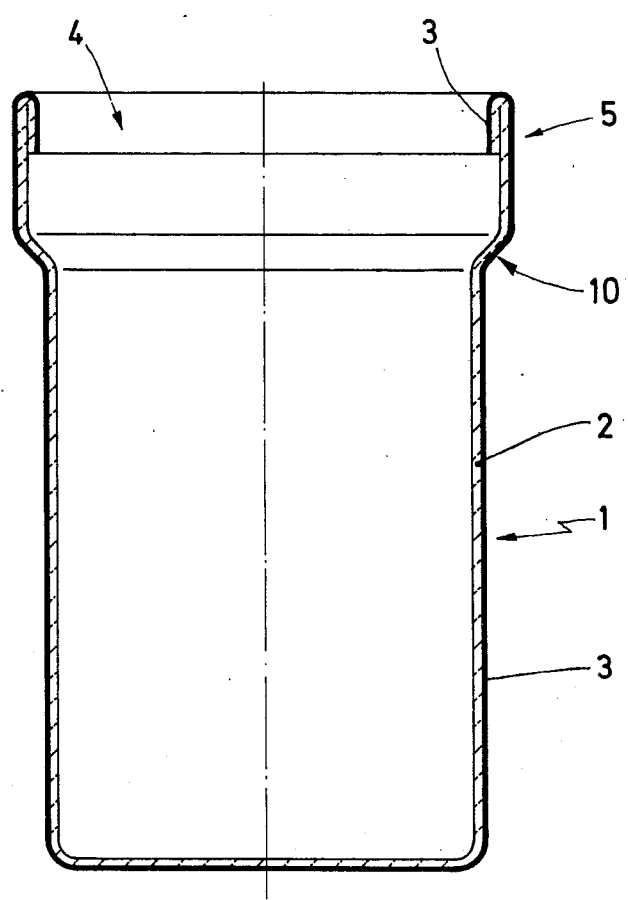
FIG. 1 is a longitudinal section through a housing for electronic or electrical components, for use in the method according to the present invention.

Referring now to the drawing, FIG. 1 illustrates a protective housing 1 for an electrical or electronic component, such as an electrolytic capacitor, the housing 1 consisting of a deeply drawn cup of a laminated material consisting of an aluminum layer 2 provided with a plastic coating 3 on the exterior surface of the housing. The housing 1 is provided with an enlarged neck 5 of a diameter larger than the diameter of the housing proper, the enlarged neck 5 being formed in the course of the deep drawing of the housing. The enlarged neck 5 has an opening 4 which is provided with a beaded flange as a result of the material of the housing being bent over at the edge of the opening such that the plastic coating 3 is situated partially on the inside of the enlarged neck portion 5 of the housing. The cross section of the housing 1 may be circular, or it may be of any other appropriate shape, such as for example, oval, square, or rectangular. Any cross section shape is suitable for applictions according to the principle of the present invention.

Figure 2:
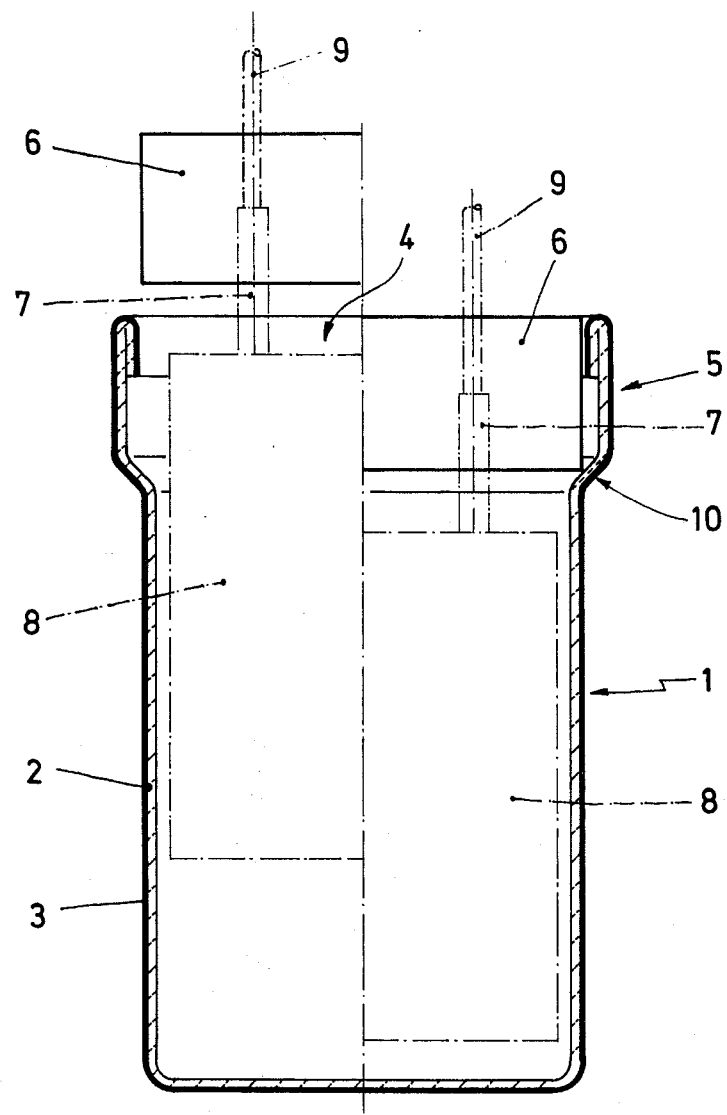
FIG. 2 illustrates two consecutive steps in inserting into the housing of FIG. 1 an electrical or electronic component attached to a resilient plug.

FIG. 2 illustrates the process steps of inserting a component such as an electrolytic capacitor and a resilient plug into the housing 1, the first step being illustrated at the left-hand half of FIG. 2, and the second step being shown at the right-hand half. It will be appreciated that the two halves of FIG. 2 can be completed symmetrically as a mirror image relative to the plane of symmetry of the figure. A resilient plug 6, made of rubber or of a similar elastomeric material, has a diameter substantially equal to the width of the housing enlarged neck portion 5 and supports, by means of electrical conductive connecting pins 7, an electrical or electronic component 8, such as a electrolytic capacitor. A terminal 9 is welded or soldered to the free end of each connecting pin 7, the terminal 9 having a diameter slightly smaller than that of the connecting pin 7. The left-hand half of FIG. 2 shows the electrolytic capacitor, or other component 8, in the process of being inserted into the housing 1 and the plug 6 disposed just above the opening 4 of the housing. The right-hand half of FIG. 2 shows the component 8 fully inserted in the housing 1, and the plug 6 disposed in the enlarged neck portion 5 of the housing, the plug 6 being supported in position by an inclined transition portion 10 integrally connecting the main body portion of the housing 1 to the enlarged neck portion 5 thereof, thus supporting the component 8 in its final position in the housing 1. As can be further seen at the right-hand half of FIG. 2, the plug 6 is somewhat loosely inserted in the enlarged neck portion 5, such that the air contained in the housing 1, which is displaced by the insertion of the component 8 and the stopper 6 into the housing, can escape through the marginal space between the edge of the plug and the rim of the opening.

Figure 3:
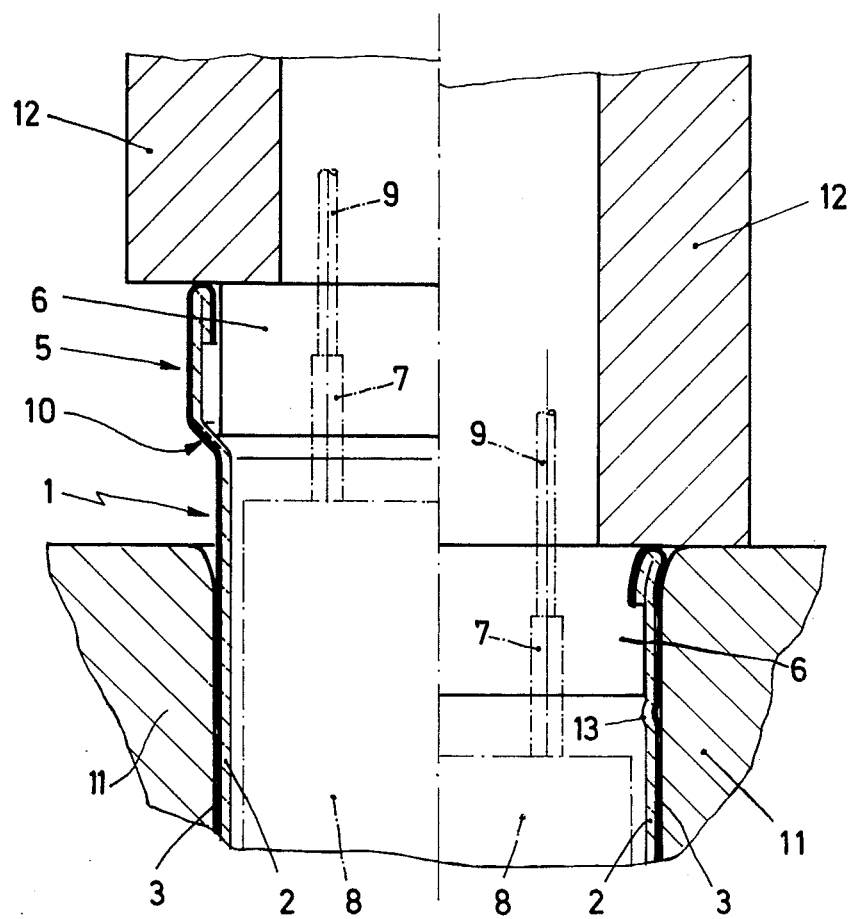
FIG. 3 illustrates the step of inserting into a crimping die the housing and the step of reducing the diameter of the enlarged neck opening of the housing.

FIG. 3 illustrates two consecutive steps in the method of the present invention. As shown at the left-hand side of FIG. 3, the housing 1 with the component 8 and plug 6 inserted therein, as previously explained with respect to FIG. 2, is placed within a crimping die 11, with the enlarged neck portion 5 of the housing extending above the surface of the die. A hollow punch 12 is advanced such as to push the housing 1 within the crimping die 11, until the face of the hollow punch 12 engages the top surface of the die 11. While the housing 1 is being pushed into the crimping die 11 by the punch 12, the diameter of the enlarged neck portion 5 of the housing is progressively reduced to the diameter of the housing 1, and the plug 6 is tightly compressed within the opening of the housing. Simultaneously with reducing the diameter of the neck portion 5 of the housing a circular inwardly projecting bead 13 is formed in the periphery of the housing 1 at a level corresponding to the transition portion 10 between the enlarged neck portion 5 and the main body portion of the housing 1. The formation of the inwardly projecting bead 13 is a very desirable occurrence because the bead acts as an abutment which prevents the plug 6 from penetrating too deeply into the housing 1.

Figure 4:
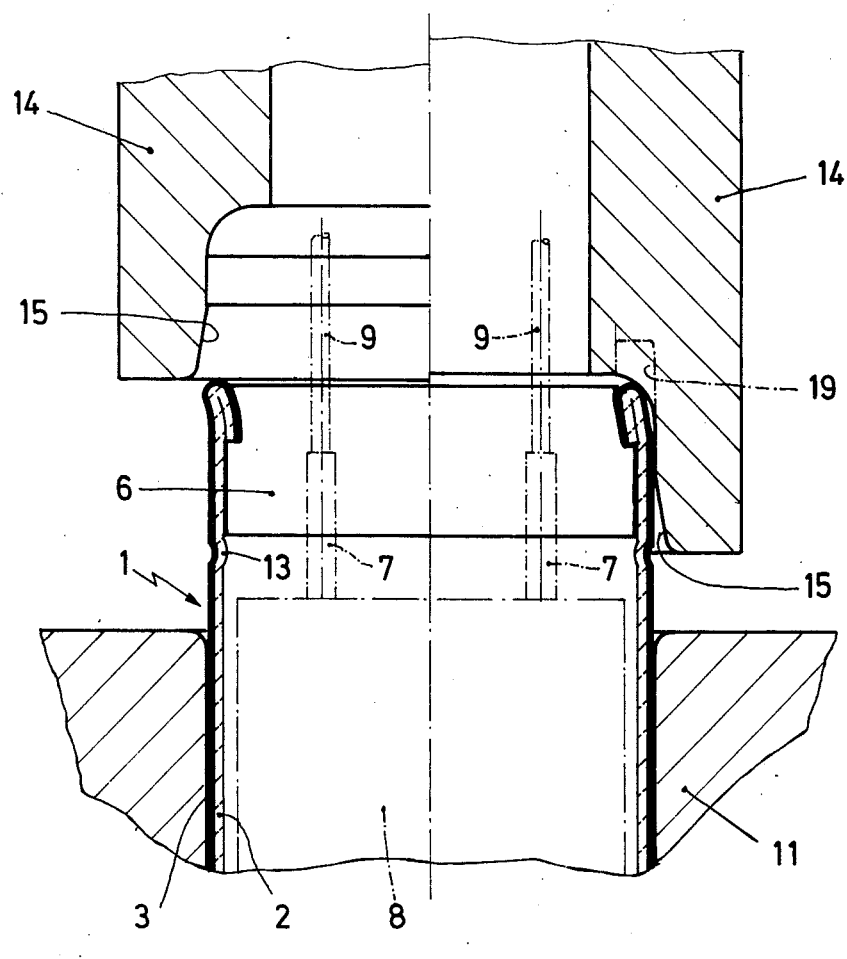
FIG. 4 illustrates two consecutive steps for beading the rim of the housing.

As shown at the left-hand side of FIG. 4, the housing 1 is subsequently pushed up above the top surface of the crimping die 11, by means of an appropriate ejector rod, not shown, disposed in the die 11 below the housing, and a second hollow punch 14 having a bell-shaped end provided with a suitably shaped inner taper 15 is pressed over the housing rim surrounding the plug 6, whereby the slightly outwardly bent rim of the housing, as shown at the left-hand half of FIG. 4, is bent inwardly as shown at the right-hand half of FIG. 4 which also illustrates the end position of the punch 14. As a result of bending inwardly the rim of the housing opening, the plug 6 is placed under further compression which tends to further set it solidly in the opening and, more particularly, the resilient material of the plug 6 is caused to press firmly on the peripheral surface of the terminal wires 9 projecting from the plug, and thus provide a strong mechanical support for the terminal wires.

Figure 5:
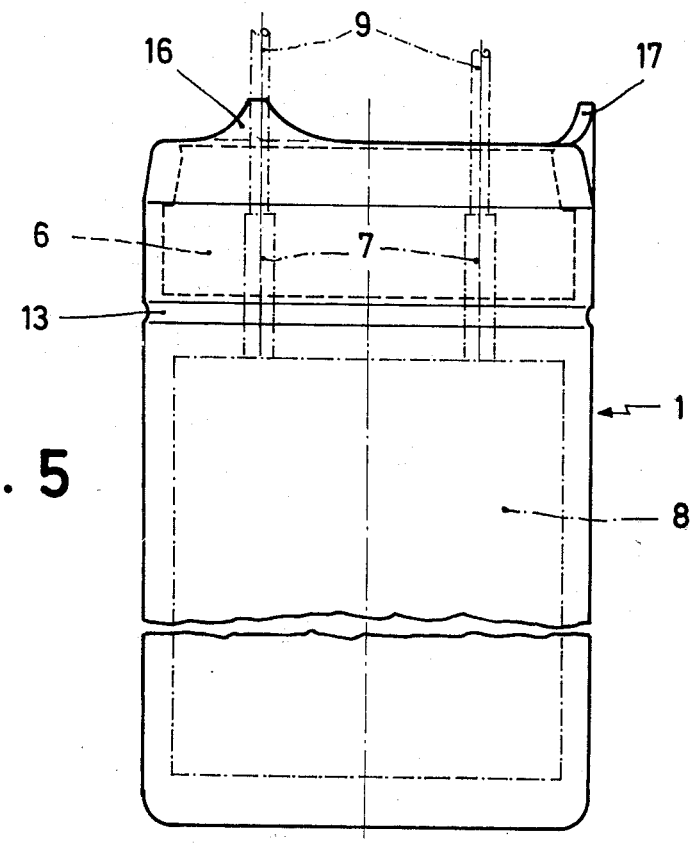
FIG. 5 illustrates a modification of the housing of FIG. 1 with a modified edge bead at the housing opening for holding the plug in position.
Figure 6:
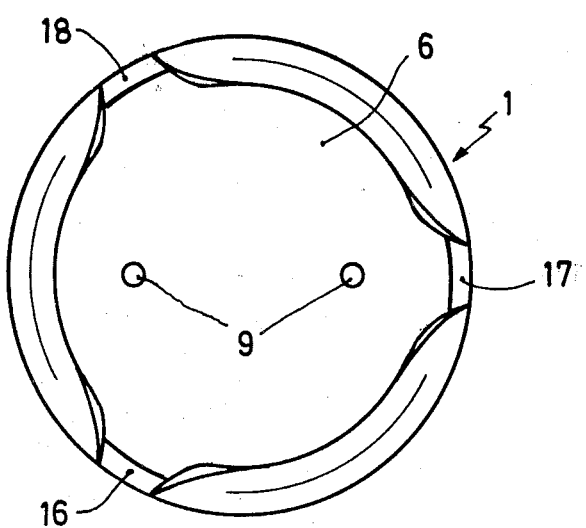
FIG. 6 is a top view of the modified housing of FIG. 5.

By way of the method of the invention, therefore, a housing 1 is closed by the plug 6 and is provided with a rim, which, even in the vicinity of the plug, can be flush with the outer surface of the plug. FIG. 5 illustrates an alternate embodiment of a housing, for example for an electrolytic capacitor, which can be obtained by the method of the present invention. In the embodiment of FIG. 5, the housing 1 has an opening rim which, instead of being flush with the outer surface of the plug, is provided with longitudinally extending short support legs, such as legs 16, 17 and 18, also shown at FIG. 6. The short support legs with which the housing 1 is provided are normally used for mounting the housing on a printed circuit, the ends of the suppport legs being soldered appropriately to metallic portions of the printed circuit, and the terminals 9 being soldered to appropriate circuit terminals, a space being provided between the bottom of the housing 1 and the printed circuit through which can be circulated an appropriate flushing agent for removing soldering residues. The support legs 16, 17 and 18 are formed by appropriate relief recesses disposed in the inner surface of the bell-shaped punch 14 of FIG. 4. The end face of the punch is shaped such as to provide inward bending of the housing rim, such that the housing is reduced in length as compared to its length prior to beading, with the exception of the projecting short support feet. The recesses providing the formation of the short support feet 16, 17 and 18 are disposed, for example, at angular positions 120° from each other such that, at those positions, the inward bending of the housing rim is not effected with the result that the short support feet 16, 17 and 18 are automatically obtained. For example, the recesses are in the shape shown in phantom line at 19 in FIG. 4 and, because the recesses 19 clear the edge of the housing rim, they leave the corresponding portions of the housing rim uneffected during bending over of the remaining of the rim. It is to be noted that the outer surface of the plug 6 is below the end of the support feet 16, 17 and 18 in the illustration of FIGS. 5 and 6.

It will be appreciated that the method of the invention is not limited to sealing a housing open at one end only, but the method of the invention can be adapted to sealing a tubular housing which is open at both ends.

Having thus described the present invention by way of illustrative examples thereof given for illustrative purpose only, modifications whereof will be apparent to those skilled in the art, what is claimed as new is as follows:

1. A method for encapsulating an electrical or electronic component in a housing, wherein said housing has an opening sealed by a resilient plug, said method comprising providing said housing opening with a widened neck rim portion, inserting said component into said housing, disposing said plug in said widened neck portion, and reducing the width of said neck portion by pushing said housing into a crimping die for holding said plug under compression at the opening of said housing.

2. The method of claim 1 further comprising bending inwardly the rim of said housing by means of a beading tool.

3. The method of claim 1 further comprising forming an inwardly directed peripheral bead in said housing during crimping.

4. The method of claim 2 further comprising forming an inwardly directed peripheral bead in said housing during crimping.

5. The method of claim 1 wherein said plug supports said electrical or electronic component.

6. The method of claim 2 wherein said plug supports said electrical or electronic component.

7. The method of claim 3 wherein said plug supports said electrical or electronic component.

8. The method of claim 4 wherein said plug supports said electrical or electronic component.

9. The method of claim 1 wherein said housing is made of metal coated with plastic at least on one surface.

10. The method of claim 2 wherein the housing rim is bent inwardly only at some areas leaving therebetween extending integral support feet for said housing.

* * * * *